United States Patent
Ramon Raygoza et al.

(10) Patent No.: US 10,266,784 B2
(45) Date of Patent: *Apr. 23, 2019

(54) LUBRICATING OIL FOR AUTOMOTIVE AND INDUSTRIAL APPLICATIONS, CONTAINING DECORATED GRAPHENE

(71) Applicant: INSTITUTO TECNOLOGICO Y DE ESTUDIOS SUPERIORES DE MONTERREY, Monterrey (MX)

(72) Inventors: Edgar David Ramon Raygoza, Monterrey (MX); Carlos Ivan Rivera Solorio, Monterrey (MX); Enrique Gimenez Torres, Monterrey (MX)

(73) Assignee: INSTITUTO TECNOLÓGICO Y DE ESTUDIOS SUPERIORES DE MONTERREY, Monterrey (MX)

( * ) Notice: Subject to any disclaimer, the term of this patent is extended or adjusted under 35 U.S.C. 154(b) by 0 days.

This patent is subject to a terminal disclaimer.

(21) Appl. No.: 14/916,895

(22) PCT Filed: Sep. 19, 2014

(86) PCT No.: PCT/MX2014/000145
§ 371 (c)(1),
(2) Date: Mar. 4, 2016

(87) PCT Pub. No.: WO2015/034340
PCT Pub. Date: Mar. 12, 2015

(65) Prior Publication Data
US 2016/0194575 A1  Jul. 7, 2016

(30) Foreign Application Priority Data
Sep. 4, 2013  (MX) .................... MX/a/2013/010175

(51) Int. Cl.
| | | |
|---|---|---|
| *C10M 113/02* | (2006.01) | |
| *C10M 125/04* | (2006.01) | |
| *B82Y 30/00* | (2011.01) | |
| *C10M 125/02* | (2006.01) | |
| *C10M 171/06* | (2006.01) | |
| *C10M 149/22* | (2006.01) | |
| *C10M 171/02* | (2006.01) | |

(52) U.S. Cl.
CPC .......... *C10M 125/04* (2013.01); *B82Y 30/00* (2013.01); *C10M 125/02* (2013.01); *C10M 149/22* (2013.01); *C10M 171/02* (2013.01); *C10M 171/06* (2013.01); *C10M 2201/041* (2013.01); *C10M 2201/05* (2013.01); *C10M 2205/0265* (2013.01); *C10M 2205/0285* (2013.01); *C10M 2229/025* (2013.01); *C10N 2220/082* (2013.01); *C10N 2230/02* (2013.01); *C10N 2250/12* (2013.01)

(58) Field of Classification Search
CPC ........................ C10M 113/02; C10M 2201/041
USPC .................................................. 508/113, 123
See application file for complete search history.

(56) References Cited

U.S. PATENT DOCUMENTS

| | | | | |
|---|---|---|---|---|
| 7,871,533 B1 * | 1/2011 | Haiping | ................. | B82Y 30/00 252/402 |
| 8,075,799 B2 * | 12/2011 | Hong | ....................... | C09K 5/10 252/70 |
| 8,222,190 B2 * | 7/2012 | Zhamu | ................. | C10M 103/02 508/113 |
| 8,648,019 B2 * | 2/2014 | Pol | ....................... | C10M 169/04 508/113 |
| 8,703,666 B2 * | 4/2014 | Tsou | .................... | C10M 161/00 508/113 |
| 8,822,386 B2 * | 9/2014 | Quintero | ................. | C09K 8/032 507/117 |
| 8,865,113 B2 * | 10/2014 | Shankman | ............. | B82Y 30/00 252/378 R |
| 8,921,286 B2 * | 12/2014 | Malshe | ................ | C10M 171/00 427/307 |
| 8,957,003 B2 * | 2/2015 | Wu | ....................... | C10M 125/02 508/113 |
| 9,080,122 B2 * | 7/2015 | Kwon | .................. | C10M 125/02 |
| 9,493,723 B2 * | 11/2016 | Sui | .......................... | E21B 10/24 |
| 2010/0255984 A1 * | 10/2010 | Sutter | ................... | B82Y 30/00 502/185 |

(Continued)

OTHER PUBLICATIONS

International Search Report, PCT/MX2014/000145, dated Jan. 20, 2015, 6 pages.

(Continued)

*Primary Examiner* — Ellen M McAvoy
(74) *Attorney, Agent, or Firm* — Baker & McKenzie LLP

(57) ABSTRACT

This patent relates to a lubricating oil with added decorated graphene nanoparticles, which is called nanolubricant. This nanolubricant has automotive and industrial applications and offers as major benefits, simultaneous improvements in the thermal, rheological and tribological properties of the lubricant used as base fluid. Additionally, this nanolubricant offers a rheopectic behavior from a specific concentration, the same behavior that gives it the ability to increase its viscosity over time provided it is subjected to a constant cutting rate. Finally, the decorated graphene may include metallic, ceramic or polymeric nanoparticles, in a concentration range of 0.5% weight/weight to 2% w/w without changing the newtonian fluid behavior of the base lubricant, whereas for concentrations greater than 2% weight/weight and up to 3% weight/weight, the aforementioned rheopectic behavior will be observed.

22 Claims, 5 Drawing Sheets
(1 of 5 Drawing Sheet(s) Filed in Color)

(56) References Cited

U.S. PATENT DOCUMENTS

| | | | |
|---|---|---|---|
| 2011/0046027 A1 | 2/2011 | Zhamu et al. | |
| 2012/0032543 A1* | 2/2012 | Chakraborty | B82Y 30/00 |
| | | | 310/90 |
| 2012/0245058 A1* | 9/2012 | Monteiro | C09K 8/032 |
| | | | 507/110 |
| 2015/0294753 A1* | 10/2015 | Ramon Raygoza | B82Y 30/00 |
| | | | 252/572 |
| 2016/0010022 A1* | 1/2016 | Sui | C10M 125/02 |
| | | | 175/57 |
| 2016/0130149 A1* | 5/2016 | Shankman | C01B 31/0446 |
| | | | 423/415.1 |
| 2017/0050855 A1* | 2/2017 | Shankman | C01B 31/0453 |

OTHER PUBLICATIONS

Zhang, Yi, et al. "Synthesis of reduced graphene oxide/Cu nanoparticle composites and their tribological properties," RSC Advances, Oct. 23, 2013 [online], vol. 3, No. 48, p. 26086-26093; paragraph 2.

Song, Hao-Jie, et al. "Synthesis of ?-Fe 2 O 3 nanorod/graphene oxide composites and their tribological properties," Journal of Materials Chemistry, 2012, vol. 22, No. 3, p. 895-902; paragraph 2.

Choudhary, Shivani, et al. "Dispersion of alkylated graphene in organic solvents and its potential for lubrication applications," Journal of Materials Chemistry, 2012, vol. 22, No. 39, p. 21032-21093; Experimental Section.

Akbulut, M., "Nanoparticle-based lubrication systems," J. Powder Metall Min, 2012, vol. 1, p. 101; paragraph "The Effect of Surface Functionalization".

\* cited by examiner

LUBRICATING OIL FOR AUTOMOTIVE AND INDUSTRIAL APPLICATIONS, CONTAINING DECORATED GRAPHENE

FIELD OF THE DISCLOSURE

The present patent application pertains to the field of chemistry, particularly to lubricant compositions added with decorated graphene. The object of the present disclosure comprises to provide a lubricant mineral oil added with decorated graphene for automotive and metal-mechanic industrial applications.

BACKGROUND

Lubricants are mainly used to eliminate contact between two elements submitted to sliding movement or lamination. Their main applications are in automotive engines, industrial gear boxes, turbines, compressors and hydraulic systems. Global consumption of lubricants is approximately 37.5 millions of tons annually, being the automotive market the main consumer, with a participation of 54%, followed by the industrial market with a 32%.

Conventional lubricants are composed by a great diversity of chemical additives for enhancing and/or incorporate new properties. The content of additives may vary from a concentration of 10% to 20% by lubricant oil volume. Some of the most common additives are those used for enhancing the viscosity, anticorrosive, antioxidant, detergent, dispersant, anti-wear, crystallization inhibition indexes, for allowing operation at high temperatures and extreme pressures, etc. however, said additives have the inconvenient that they are constituted by sulphates, phosphates and chlorates, which are highly damaging compounds for the environment, besides being very expensive and being technically limited. That is, in some cases, such kind of additives are required to be operated within a limited temperature and/or specific conditions to be activated and to adequately function.

On the other hand, highly efficient industries such as the automotive industry, aim medium-term goals (5-10 years) at reducing by 18% the losses due to friction between main components such as the engine. If such goals are achieved, a worldwide fuel consumption reduction is expected in the order of 41 thousand millions of liters of fuel, as well as a reduction of 101 millions of tons of CO2 to the environment.

Due to the above, it has aroused interest in the scientific community to find low cost and environmentally friendly alternative additives, for which nano additives are an option with great potential for this purpose. There have been reported numerous works about the development of lubricants having nano additives. Below are mentioned the most important.

US patent application No. 2011/8076809 of Tingler et al., describes a submersible electric motor filled with nano fluid as coolant. The base fluid used was a synthetic oil, and the nanoparticles used were selected from the group comprising carbon nanotubes, graphite, diamond, silicon dioxide, aluminum oxide, beryllium oxide, nitride and combinations thereof. The concentration of nanoparticles ranged from 5% to 30% by volume.

US patent application No. US-2004/6828282B2, describes am additive for gasoline and lubricants based on carbon nanotubes. The concentration used was of between 0.01% to 15% by weight, with an aspect ratio of between 5:1 to 100:1, preferably of between 5:1 to 100:1. The reported benefits comprise an increment of the combustion capacity of the gasoline, as well as an increment of the viscosity for the lubricant fluid.

Patent application No. US-2008/7449432B2 of Lockwood, describe an industrial oil added with nanoparticles derived from carbon having a size of between 50 nm to 500 nm at a concentration of between 0.01% to 15% by weight. Besides, conventional additives were added to the nano lubricant, such as detergents, dispersants, antioxidants, etc. The reported benefits comprise viscosity, thermic conductivity and friction coefficient improvements.

International patent application No. WO-2011/046524 A1 of Akin et al. describe a nano additive for lubricant oil and gasoline based on hexagonal boron nitride nanoparticles, boron diamond and boron nitride having a size of 1 nm to 5 nm. The resultant nanolubricant. The resulting nanolubricant further contained at least one conventional anti-friction or anti-wear type additive. Reported benefits comprise improved gasoline combustion capacity as well as reduction in the friction and wear coefficient for use in the lubricating fluid.

US patent application No. 2011/7994105 B2, describe a nano additive for automotive lubricants based on ceramic nanoparticles, silicates, cubic boron nitride and diamond, having a size of between 20 nm to 40 nm, and concentrations of 0.02% to 10% by weight. The reported benefits comprise a reduction in friction coefficients and improvements in fuel efficiency of around 35% for a variety of vehicles.

US patent application No. US-2007/0158609 A of Hong et al. describe a process for preparing a stable suspension of nano carbon particles. The nanoparticles were selected from a group comprising diamond, graphite, fullerenes, carbon nanotubes and a combination thereof, at a concentration of between 0.1% to 30% by weight. The refrigerant oil used as base fluid showed improvements in its rheological, thermal and tribological properties.

US patent application No. US-2010/0029518 A1 of Markovitz et al. describe a nano additive for an automotive and industrial lubricant based on carbon and diamond nanoparticles. The used concentration of nanoparticles was of 10 ppm to 500 ppm by weight, additionally, the composition contains from 200 ppm to 2000 ppm of water.

Finally, US patent application No. US-2011/0046027 A1 of Aruna Zhamu et al, describe a lubricant composition based on mineral oil or synthetic oil incorporating graphene nanoflakes in a dispersed form and at a proportion of 0.001% to 60% by weight. These graphene nanoflakes are preferably single layered and depending on their amount, the lubricant tends to be a fat.

The mineral oil or synthetic oil modified with these graphene nanoflakes has better thermal conductivity, better friction coefficient, a better anti-wear performance and better viscosity stability compared with mineral oils or synthetic oils that are only modified with graphene nanoparticles or carbon nanotubes.

BRIEF DESCRIPTION OF THE FIGURES

The file of this patent contains at least one drawing executed in color. Copies of this patent with color drawing(s) will be provided by the Patent and Trademark Office upon request and payment of the necessary fee.

DETAILED DESCRIPTION

Figure 1:
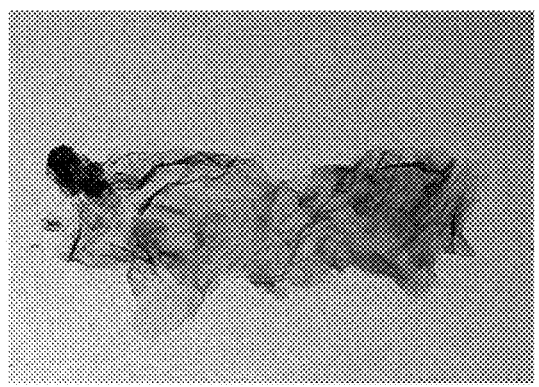
FIG. 1. TEM image of a graphite nanoflake.

The present patent application provides a lubricant oil for automotive applications, especially for combustion engines; and industrial applications such as industrial gearboxes, compressors and turbines; said oil is characterized by comprising:

a) Graphite nanoflakes decorated with metallic nanoparticles, ceramic nanoparticles, polymeric nanoparticles or combinations thereof; dispersed in b) A lubricating oil that is optionally mineral or synthetic; the mineral oil preferably naphthenic, paraffinic or aromatic and the synthetic oil is preferably poly alpha olefin, poly isobutylene, esters or even silicone.

The decorated graphite nanoflakes dispersed in oil are unilaminar, multilaminar or a combination of the above; and regardless of the presentation, are at a concentration range of 0.5%-3.0% weight/weight based on the total weight of the lubricating oil.

It is important to note that the decoration of the graphene nanoflakes consist of the chemical bonding of metallic nanoparticles, ceramic nanoparticles or polymeric nanoparticles with a density of 30-300 nanoparticles per each graphene nanoflake.

Particularly the ceramic particles decorating the graphene are optionally: spherical nanoparticles of aluminum oxide, aluminum nitride, titanium oxide, copper oxide, zinc oxide, silicon oxide and combinations thereof in a size range 50-100 nm.

Distinctly, the metallic particles decorating the graphene are optionally: spherical nanoparticles of copper, silver, gold, aluminum, titanium, chromium, iron, cobalt and tin and combinations thereof.

And meanwhile, the polymeric particles decorating the graphene are optionally selected from a group comprising of polyaniline nanotubes, preferably of leucoemeraldine, emeraldine or pernigraniline morphology, with a width in a range of 40-50 nm and a length in the range of 150-200 nm.

The physical properties distinguishing the lubricating oil for automotive and industrial applications added with decorated graphene of this patent application are: friction coefficient, viscosity, wear, thermal conductivity, stability.

The determination of: Thermal conductivity, viscosity, friction coefficient and wear was made in the formulation of mineral oil added with graphene decorated with metallic nanoparticles, particularly decorated with copper; and polymeric nanoparticles specifically polyaniline nanotubes. Said properties were determined for each type of mineral oil at two different concentrations. A first concentration of 0.5% weight/weight of graphene decorated with lubricating oil and a second concentration of 2% weight/weight of graphene decorated with lubricating oil.

The evaluated formulations were mineral lubricating oil added with graphene, motor oil added with graphene decorated with copper and motor oil added with graphene decorated with polyaniline. The evaluated concentrations were. The results obtained in thermal conductivity, viscosity, friction coefficient and wear for each of the above formulations are detailed below. And the obtained results are presented in Table 1.

TABLE 1

Variation of the physical properties that have lubricating oil with graphene decorated with different particles at different concentrations and temperature.

| Physical properties | Concentration Temperature [° C.] | Lubricating oil | Oil with Graphene (NPG) 0.5 | (NPG) 2.0 | Oil with decorated graphene Copper 0.5 | Copper 2.0 | Polyaniline 0.5 | Polyaniline 2.0 |
|---|---|---|---|---|---|---|---|---|
| Friction coefficient | 100 ± 2 | 0.124 | 0.132 | 0.122 | 0.086 | 0.073 | 0.090 | 0.102 |
| Wear [mm³] | 100 ± 2 | 1.28 | 1.02 | 0.89 | 0.47 | 0.46 | 0.93 | 0.84 |
| Thermic conductivity [W/m° K] | 25-43 | 0.139 | 0.152 | 0.180 | 0.155 | 0.229 | 0.140 | 0.144 |
| Viscosity [cP] | 25 ± 2 | 182 | 195 | 479 | 154 | 883 | 141 | 154 |
|  | 35 ± 2 | 110 | 134 | 339 | 105 | 523 | 92 | 99 |
|  | 43 ± 2 | 69 | 93 | 293 | 95 | 355 | 62 | 66 |

The friction coefficient was determined through a tribometer having a block-ring configuration, which is specific for evaluating lubricants. The test was conducted under conditions of rotating or oscillating movement, nonconforming (linear) contact at a temperature of 100° C. The determination was carried out according to ASTM D 2981, D 3704, G 77 and D 2714 norms. All experiments were performed using the same test parameters, which were 200 nW load, speed of 300 rpm on a path of 1000 m. The metal pair with which wear and friction tests were performed, consist of a ring manufactured from a carbon steel having a hardness of 62 HRC, which is rolled on a machining block from AISI 1045 steel with a hardness of 48 HRA. Both the ring and the metal block are formed of a metal preferably steel.

Based on the results presented in Table 1, the lubricating oil added with graphene decorated with copper shows a reduction in the friction coefficient. Particularly, the lubricating oil added with graphene decorated with copper has a reduction in the coefficient of friction of 43% compared to a lubricating oil without graphene; and a reduction of 45% compared to the lubricating oil added with undecorated graphene.

It is important to note that a lubricating oil having a lower friction coefficient is a favorable feature, because this causes a decrease in the abrasive effect between the metallic pair undergoing a sliding or rolling movement or. Additionally, a reduction in friction reduces the heat produced by the moving metal pair, therefore impacting the stability of lubricating oil viscosity.

Regarding the wear of the lubricating oil added with graphene decorated with copper, having the values shown in Table 1, it was determined that this parameter decreased to 64% with respect to the lubricating oil; and up to 48% compared to the lubricating oil with undecorated graphene. The decrease in the wear in the lubricating oil that is located between a metal pair to avoid contact, causes an increase of the useful life of the metal pair subjected to rolling and sliding movement.

Thermal conductivity measurements were performed using a KD2 probe (Decagon Device Inc., model KD2Pro). This device is based on the transient hot wire method, where a wire of finite length is completely immersed in a liquid medium consisting of the lubricating oil of this application and is electrically heated. While the wire is heated, the change in the resistance is measured as a function of time. The thermal conductivity value is determined from the heating power and the slope of the temperature change with a logarithmic timescale.

According to the data presented in Table 1, it can be determined that the thermal conductivity of the lubricating oil added with graphene decorated with copper increases by 65% with respect to the lubricating oil; and 27% with respect to the lubricating oil with undecorated graphene, this increase in thermal conductivity results in greater heat dissipation between the metal pair in which it is located and consequently supports viscosity reduction associated with high temperatures.

The viscosity was measured using a viscometer model LVDV-E of the Brookfield brand. Measurements were performed at temperatures of 25±2° C., 35±2° C. and 43±2° C. The temperature of the sample was controlled by an electric bath. And based on the results shown in Table 1, it was observed that the viscosity is inversely proportional to the temperature, such that, at a temperature of 25±2° C. the viscosity of the lubricating oil added with decorated graphene is 385% higher than the lubricant oil; and 84% higher than the lubricating oil added with undecorated graphene; and at a temperature of 43±2° C. the viscosity of the lubricating oil added with decorated graphene is 414% higher than the lubricating oil; and 21% higher than the lubricating oil added with undecorated graphene. Characteristically, the mineral oil lubricant added with graphene decorated with metallic particles shows a Newtonian behavior when added up to 2% weight/weight.

Figure 9:
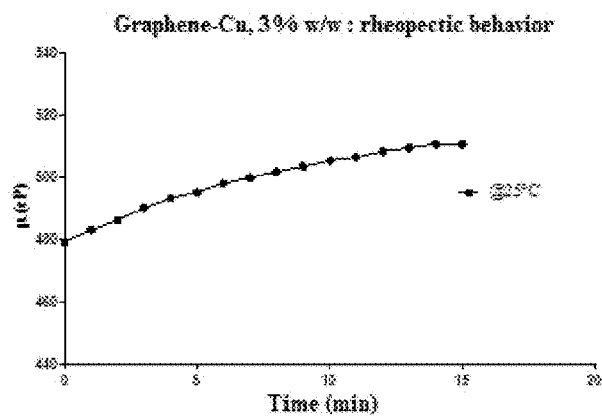
FIG. 9. Rheopectic behavior of mineral lubricating oil added with graphene decorated with copper at a concentration of 3% by weight and at a temperature of 25° C.
Figure 10:
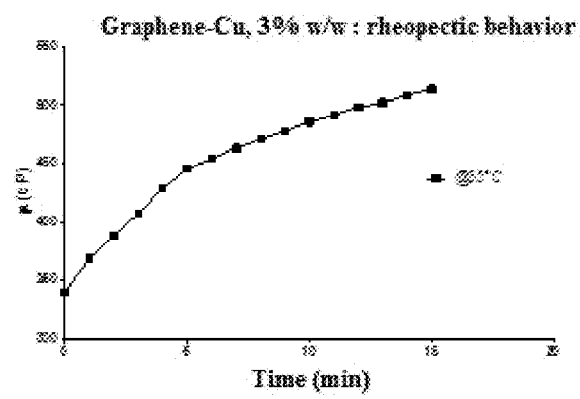
FIG. 10. Rheopectic behavior of mineral lubricating oil added with graphene decorated with copper at a concentration of 3% by weight and at a temperature of 35° C.
Figure 11:
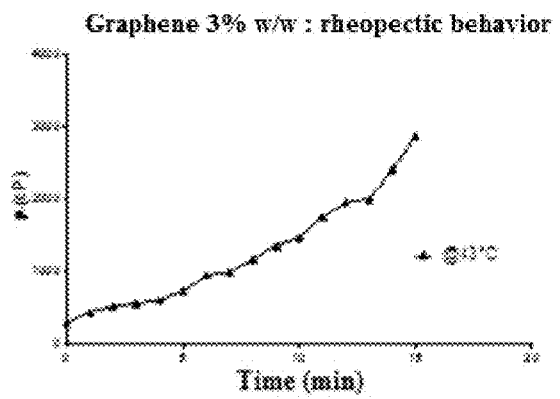
FIG. 11. Rheopectic behavior of mineral lubricating oil added with graphene decorated with copper at a concentration of 3% by weight and at a temperature of 43° C.

Distinctly, mineral lubricating oil added with graphite decorated with metallic particles in a concentration range higher than 2% and up to 3% weight/weight based on the total weight of the lubricating oil, has a rheopectic rheological behavior that increases proportionally to the increase in temperature; so that when the lubricating oil added with decorated graphene, preferably with metallic particles has a concentration of 3% weight/weight, at a temperature of 35±2° C. the rheopectic behavior increases the viscosity by 66% over a period of time of 15 min with a shear rate of 5 rpm; and when it is at a temperature of 25±2° C. its rheopectic behavior increases its viscosity by 6.2% over a period of time of 15 min with a shear rate of 5 rpm; and in another example, when the same lubricating oil is subjected to a temperature of 43±2° C. its rheopectic behavior increases its viscosity by 800% over a period of time of 15 min with a shear rate of 5 rpm (FIGS. 9, 10 and 11).

With the rheopetic or rheopexy term it is understood to be a rare property of some non-newtonian fluids consisting of showing an increase in time dependent viscosity, the higher the shear stress to which is subject, the higher its viscosity.

Some lubricating oils such as the one of the present patent application begin to thicken, being able to solidify when subjected to large shear stress over long periods of time.

The stability of the nanoparticles suspended in the lubricating oil was performed by the method of sedimentation balance. In this method, the weight of sedimented nanoparticles is measured during a certain period. The suspension fraction (Fs) of graphene nanoparticles at a certain time was calculated by the following equation:

$$Fs=(W0-W)/W0$$

Wherein:
$W_0$=total weight of all nanoparticles in the measured space.
W=Weight of nanoparticles sediment at a given time.

Based on the above method it was found that for a period of four months, the fraction of sedimented graphene nanoparticles was zero in rest conditions, exposed to light and closed.

The lubricating mineral oil added with decorated graphene comprises: mineral oil and nanoadditives.

The oil is mineral (paraffinic, naphthenic and aromatic) or synthetic (poly-alpha-olefins, polyisobutylene, esters, silicone).

The nanoadditives consist of decorated graphene. unilaminar, multilaminar or a combination thereof with particles of at least one of the following sources: ceramic, metallic and polymeric; and forming 0.05-3% weight/weight of the mineral lubricating oil.

The ceramic particles decorating the graphene, optionally comprises: aluminum oxide or aluminum nitride in a size range of 50-100 nm.

The metal particles decorating the graphene optionally comprises: copper or silver spheres with a size in the range of 50-100 nm.

The polymeric particles decorating the graphene optionally comprises: polyaniline nanotubes with a width in the range of 40-50 nm and a length in the range of 150-200 nm.

The distinctive features of the lubricating mineral oil added with decorated graphene mainly are mainly found in: friction coefficient, viscosity, wear, thermal conductivity, stability and exhibits Newtonian behavior when added up to 2% weight/weight.

Characteristically, the lubricating mineral oil added with graphene decorated with metallic nanoparticles has a rheopectic behavior when its concentration is higher than 2% to 3% weight/weight.

The stability that this oil has shown is of four months under resting conditions, exposed to light and closed.

DESCRIPTION OF EXAMPLES

In order to demonstrate the differences shown by a base fluid added with graphene nanoparticles, graphene nanoparticles decorated with copper and polyaniline, an experiment was designed to evaluate their behavior, the tests are shown in Table 2. Each nanoparticle contained in the base fluid had a different concentration. Nanoparticles and concentrations were defined according to preliminary testing and review of the literature. All nano lubricant formulations had commercial lubricating oil as base fluid. The commercial lubricating oil was Akron 25W-50. The evaluated nanoparticles were graphene nanoflakes (graphene), having a thickness <5 nm, and concentrations of 0.5% weight/weight and 2% weight/weight; graphene nanoflakes decorated with copper (graphene-cu), having a thickness <5 nm, and the concentration of 0.5% weight/weight and 2% weight/weight (w/w); and graphene nanoflakes decorated with polyaniline (Graphene-PANI), having a thickness <5 nm, and concentration of 0.5% weight/weight and 2% weight/weight.

TABLE 2 experiment design

| Base Fluid | Nanoparticle | Nanoparticle Concentration (% w/w) |
|---|---|---|
| Base Fluid | Graphene | 0.5 |
| Base Fluid | Graphene | 0.2 |
| Base Fluid | Graphene —Cu | 0.5 |
| Base Fluid | Graphene —Cu | 0.2 |
| Base Fluid | Graphene PANI | 0.5 |
| Base Fluid | Graphene PANI | 0.2 |

The concentration of 0.5% weight/weight was established because it was the minimum concentration at which significant changes were observed in the properties of nanolubricants. Furthermore, the concentration of 2% weight/weight was selected because it was the maximum amount of nanoparticles that the nanolubricants can accept without changing its newtonian behavior to a rheopectic type non-Newtonian behavior.

The production process of all experiments, consisted of a first step of mixing the nanoparticles and the base fluid using magnetic stirring. Subsequently a pre-agitation is carried out in an ultrasonic bath, and a final step of deagglomerating and reducing the size of the nanoparticles by sonication by ultrasound in ice-water bath.

Example 1

Lubricating oil added with undecorated graphene at concentrations of 0.5% weight/weight and 2% weight/weight. This formulation was evaluated as reference for comparison purposes against decorated graphene nanoflakes. Graphene nanoparticles (FIG. 1) were obtained as follows:

It starts from natural graphite powder, which was oxidized using the Staudenmaier modified method to produce graphite oxide. For that, the graphite was mixed with sulfuric acid, nitric acid and potassium chlorate. After completion of the oxidation reaction, the solution was filtered and washed repeatedly with deionized water until the pH of the filtrate was neutral. Finally, the graphite oxide was heated at 1050° C. in an inert atmosphere to produce an exothermic reaction can exfoliate graphene flakes.

Figure 4:
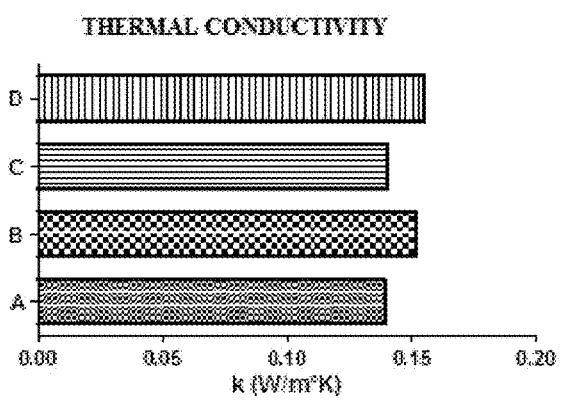
FIG. 4. Comparison of the thermal conductivity of different mineral lubricating oils added with decorated graphene at a concentration of 0.5% by weight, wherein A=engine oil; B=Graphene, 0.5% p/w; C=Graphene-PANI, 0.5% weight/weight; D=Graphene-Cu, 0.5% weight/weight.
Figure 5:
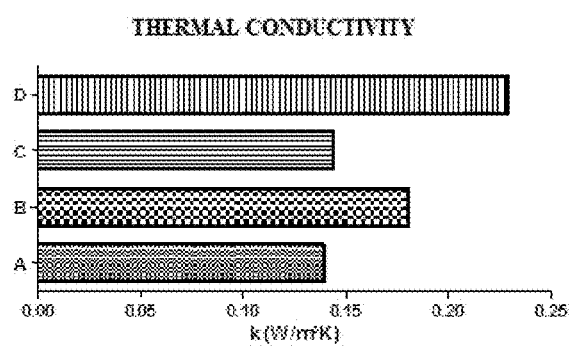
FIG. 5. Comparison of the thermal conductivity of different mineral lubricating oils added with decorated graphene at a concentration of 2% by weight, wherein A=engine oil; B=Graphene, 2% p/w; C=Graphene-PANI, 2% weight/weight; D=Graphene-Cu, 2% weight/weight.
Figure 6:
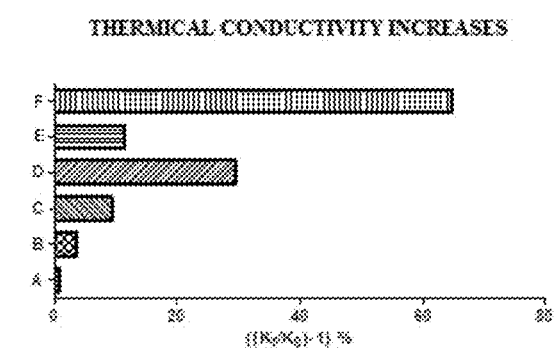
FIG. 6. Percentage increase in thermal conductivity observed for different mineral lubricating oils added with decorated graphene at concentrations of 0.5 and 2% by weight, wherein: A=Graphene-PANI, 0.5%; B=Graphene-PANI, 2%; C=Graphene, 0.5%; D=Graphene, 2%; E=Graphene-Cu, 0.5%; F=Graphene-Cu, 2%.

Thermal conductivity measurements were carried out at 25° C. and 45° C., however, no significant differences were observed between these temperatures. The results of thermal conductivity for concentrations of 0.5% w/w and 2% w/w were 0.152 W/m° K and 0.180 W/m° K, respectively (FIGS. 4, 5). Representing increases of 10% and 30% with respect to the lubricating oil without addition of nanoparticles (FIG. 6).

Figure 7:
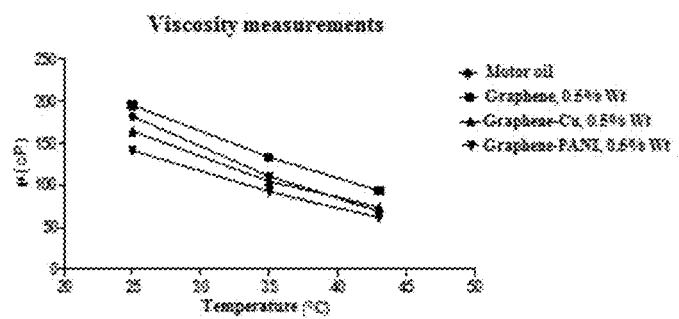
FIG. 7. Viscosity comparison of different mineral lubricating oils added with decorated graphene at a concentration of 0.5% by weight.
Figure 8:
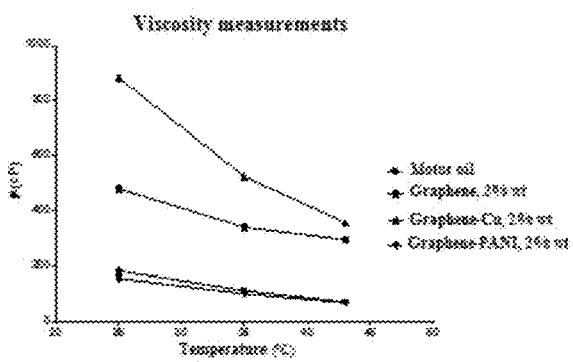
FIG. 8. Viscosity comparison of different mineral lubricating oils added with decorated graphene at a concentration of 2% by weight.
Figure 12:
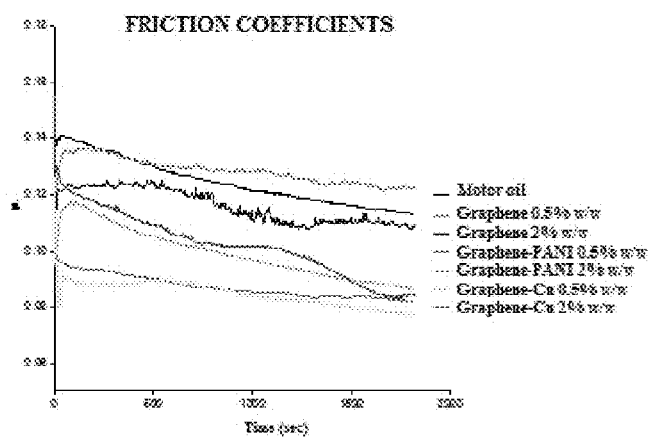
FIG. 12. Comparative of the friction coefficient of different mineral lubricating oils added with decorated graphene at concentrations of 0.5 and 2% by weight.
Figure 13:
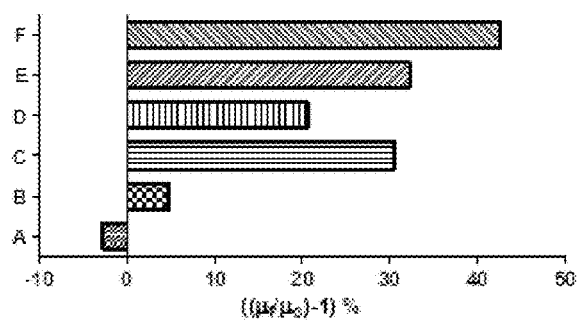
FIG. 13. Percentage reduction of friction coefficient observed for different mineral lubricating oils added with decorated graphene at concentrations of 0.5 and 2% by weight, wherein: A=Graphene, 0.5%; B=Graphene, 2%; C=Graphene-PANI, 0.5%; D=Graphene-PANI, 2%; E=Graphene-Cu, 0.5%; F=Graphene-Cu, 2%.
Figure 14:
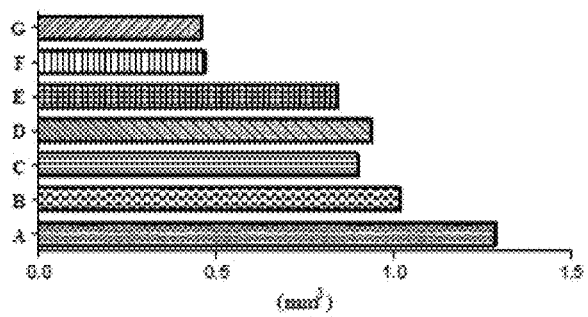
FIG. 14 Comparative of wear of different mineral lubricating oils added with decorated graphene at concentrations of 0.5 and 2% by weight, wherein A=engine oil; B=Graphene, 0.5%; C=Graphene, 2%; D=Graphene-PANI, 0.5%; E=Graphene-PANI, 2%; F=Graphene-Cu, 0.5%; G=Graphene-Cu, 2%.
Figure 15:
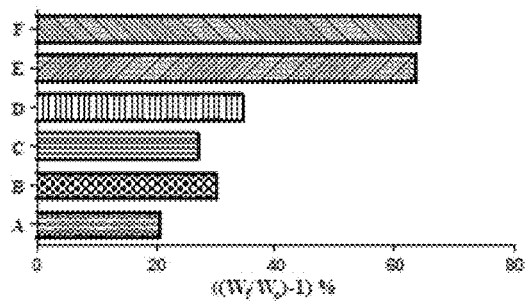
FIG. 15 Reduction percentage in wear observed for different mineral lubricating oils added with decorated graphene at concentrations of 0.5 and 2% by weight, wherein: A=Graphene, 0.5%; B=Graphene, 2%; C=Graphene-PANI, 0.5%; D=Graphene-PANI, 2%; E=Graphene-Cu, 0.5%; F=Graphene-Cu, 2%.

The viscosity measurements were carried out at 25° C., 35° C. and 43° C. For a concentration of 0.5% w/w. measurements were 195 cP, 134 cP and 93 cP at 25° C., 35° C. and 43° C. respectively. For a concentration of 2% w/w, measurements were 479 cP, 339 cP and 293 cP at 25° C., 35° C. and 43° C. respectively. (FIGS. 7, 8). Average friction coefficient measurements were 0.128 and 0.119 for concentrations of 0.5% w/w and 2% w/w respectively (FIG. 12). Which represented an increase of 2.8% and 4.8% respectively reduction in the friction coefficient (FIG. 13). On the other hand, as to wear, the lubricating oil without nanoparticles had a wear of 1.28 mm$^3$, while lubricating oil added with graphene nanoflakes at 0.5% w/w and 2% w/w were 1.02 mm³ 0.89 mm³ respectively (FIG. 14). Which represents wear reduction rates of 20% and 30% for the respective concentrations (FIG. 15).

Example 2

Figure 2:
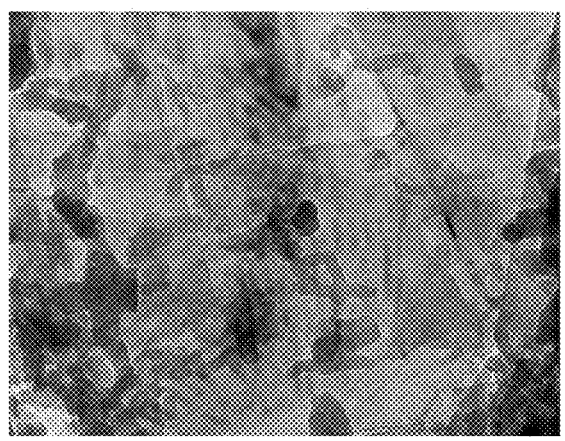
FIG. 2. TEM image of graphene nanoflake decorated with copper.

Lubricating oil added with graphene decorated with copper at concentrations of 0.5% w/w and 2% w/w. Graphene nanoparticles decorated with copper (FIG. 2) were obtained as follows:

It starts with graphite oxide, which was dispersed in a solution of $NH_3$ by ultrasonic agitation. Then it was added $[Cu(NH_3)_4]SO_4$ to the solution under continued stirring. The obtained compounds were gradually calcined in an oven at room temperature and then heated to 1000° C. Finally, in the same furnace, an exothermic reaction occurred to achieve exfoliation of graphene nanoflakes decorated with copper.

Thermal conductivity measurements were carried out at 25° C. and 45° C., however, no significant differences were observed between these temperatures. The results for concentrations of 0.5% w/w and 2% w/w were 0.155 W/m° K and 0.229 W/m° K, respectively (FIGS. 4, 5). Representing increases of 15% and 65% compared to the lubricating oil without addition of nanoparticles (FIG. 6).

The viscosity measurements were carried out at 25° C., 35° C. and 43° C. In the case of the concentration of 0.5% w/w. measurements were 154 cP, 105 cP and 95 cP at 25° C., 35° C. and 43° C. respectively. For a concentration of 2% w/w, measurements were 883 cP, 523 cP and 355 cP at 25° C., 35° C. and 43° C. respectively. (FIGS. 7, 8).

Measurements of average friction coefficient were 0.118 and 0.102 for the concentrations of 0.5% w/w and 2% w/w respectively (FIG. 12). Which represented reductions of 33% and 43% respectively in the coefficient of friction (FIG. 13). On the other hand, as to wear, the lubricating oil without nanoparticles had a wear of 1.28 mm3, while lubricating oil added with graphene nanoflakes decorated with copper at 0.5% w/w and 2% w/w were 0.47 mm³ and 0.46 mm³ respectively (FIG. 14). Which represents wear percentage reduction of 63% and 64% for the respective concentrations (FIG. 15).

Example 3

Figure 3:
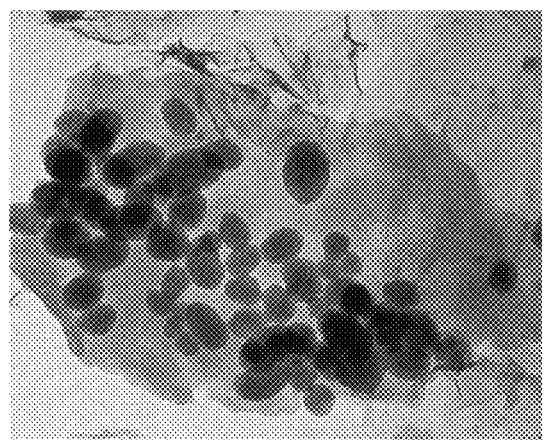
FIG. 3. TEM image of graphene nanoflake decorated with polyaniline.

Lubricating oil added with graphene decorated with polyaniline at concentrations of 0.5% w/w and 2% w/w. Graphene nanoparticles decorated with polyaniline (FIG. 3) were obtained as follows:

A solution of aniline dissolved in deionized water was prepared, to which a proportion of graphene nanoflakes were added, and then ultrasonically stirred. On the other hand, a second solution containing ammonium persulfate, hydrochloric acid and deionized water was prepared. Then it was proceeded to mix the two solutions by magnetic stirring. Finally, the solution is filtered and dried under vacuum at a temperature of 60° C.

Thermal conductivity measurements were carried out at 25° C. and 45° C., however, no significant differences were observed between these temperatures. The results for concentrations of 0.5% w/w and 2% w/w were 0.140 W/m° K and 0.144 W/m° K, respectively (FIGS. 4, 5). Which represent increases of 2% and 5% with respect to the lubricating oil without the addition of nanoparticles (FIG. 6).

The viscosity measurements were carried out at 25° C., 35° C. and 43° C. For the concentration of 0.5% w/w. the measurements were 141 cP, 92 cP, 62 cP, at 25° C., 35° C. and 43° C. respectively. For a concentration of 2% w/w, the measurements were 154 cP, 99 cP and 66 cP at 25° C., 35° C. and 43° C. respectively. (FIGS. 7, 8).

Average friction coefficient measurements were of 0.117 and 0.103 for concentrations of 0.5% w/w and 2% w/w respectively (FIG. 12). Which represented reductions of 20% and 30% respectively in said friction coefficient (FIG. 13). On the other hand, as to wear, the lubricating oil without nanoparticles, had a wear of 1.28 mm³, while lubricating oil added with graphene nanoflakes decorated with polyaniline at 0.5% w/w and 2% w/w were 0.93 mm³ and 0.84 mm³ respectively (FIG. 14). Which represent wear reduction rates of 27% and 35% for the respective concentrations (FIG. 15).

Example 4

Lubricating oil added with graphene decorated with copper at concentrations of 3% w/w. Graphene nanoparticles decorated with copper were obtained as described in Example 2 of this document.

In this formulation a rheopectic type non-Newtonian behavior was observed. Viscosity measurements were performed at 25° C., 35° C. and 43° C. at a constant cutting rate of 5 rpm and said rheopectic behavior was measured over a period of 15 minutes.

For lubricating oil added with graphene decorated with copper at a concentration of 3% w/w at 25° C., an increase in viscosity cP 480 cP to 510 in 15 minutes (FIG. 9) was observed. In the case of lubricating oil added with graphene decorated with copper at a concentration of 3% w/w to 35° C., an increase in viscosity of 340 cP to 515 cp in 15 minutes (FIG. 10) was observed. For lubricating oil added with graphene decorated with copper at a concentration of 3% w/w at 43° C., an increase in viscosity of 300 cp to 2800 cP in 15 minutes (FIG. 11) was observed.

The invention claimed is:

1. A combustion engine lubricating oil comprising: a) structurally modified graphite nanoflakes chemically bonded to nanoparticles selected from the group consisting of metallic nanoparticles, ceramic nanoparticles, polymeric nanoparticles and combinations thereof, and b) a lubricating oil, wherein the structurally modified graphite nanoflakes are dispersed in the lubricating oil and the lubricating oil is optionally mineral or synthetic lubricating oil;

wherein the structurally modified graphite nanoflakes are unilaminar, multilaminar or a combination of unilaminar and multilaminar, and the concentration of structurally modified graphite nanoflakes is about 0.5% to about 3.0% weight/weight based on the total weight of the lubricating oil, wherein the density of the chemically bonded nanoparticles is about 30 to about 300 nanoparticles per structurally modified graphite nanoflake;

wherein the ceramic nanoparticles (i) are spherical nanoparticles having a diameter of about 50 nm to about 100 nm and (ii) comprise aluminum oxide, aluminum nitride, titanium oxide, copper oxide, zinc oxide, silicon oxide or combinations thereof;

wherein the metallic nanoparticles are spherical nanoparticles and comprise copper, silver, gold, aluminum, titanium, chromium, iron, cobalt, tin or combinations thereof; and wherein the polymeric nanoparticles are optionally polyaniline nanotubes (x) having a morphology selected from the group consisting of leucoemeraldine, emeraldine and pernigraniline morphology, and (y) having a width of about 40 nm to about 50 nm and a length of about 150 nm to about 200 nm.

2. The combustion engine lubricating oil according to claim 1, wherein the lubricating oil is mineral oil selected from the group consisting of naphthenic, paraffinic and aromatic.

3. The combustion engine lubricating oil according to claim 1, wherein the lubricating oil added with structurally modified graphite nanoflakes chemically bonded to copper has a reduction of 43% in the coefficient of friction compared to a lubricating oil without graphite nanoflakes, and wherein the lubricating oil added with structurally modified graphite nanoflakes chemically bonded to copper has a reduction of 45% in the coefficient of friction compared to a lubricating oil without structurally modified graphite nanoflakes.

4. The combustion engine lubricating oil according to claim 3, wherein the lubricating oil with a lower friction coefficient causes a decrease in the abrasive effect between a metallic pair undergoing a sliding or rolling movement, and wherein the lubricating oil with a lower friction coefficient reduces the heat produced by the moving metal pair and impacting the stability of lubricating oil viscosity.

5. The combustion engine lubricating oil according to claim 1, wherein the wear of the lubricating oil added with structurally modified graphite nanoflakes chemically bonded to copper decreases to 64% with respect to the lubricating oil, and wherein the wear of the lubricating oil added with structurally modified graphite nanoflakes chemically bonded to copper is up to 48% compared to the lubricating oil without structurally modified graphite nanoflakes.

6. The combustion engine lubricating oil according to claim 5, wherein the decrease in the wear in the lubricating oil that is located between a metal pair to avoid contact causes an increase in the useful life of the metal pair subjected to rolling and sliding movement.

7. The combustion engine lubricating oil according to claim 1, wherein the thermal conductivity of the lubricating oil added with structurally modified graphite nanoflakes chemically bonded to copper increases by 65% with respect to the lubricating oil, and wherein the thermal conductivity of the lubricating oil added with structurally modified graphite nanoflakes chemically bonded to copper increases by 27% with respect to a lubricating oil without structurally modified graphite nanoflakes.

8. The combustion engine lubricating oil according to claim 7, wherein the increase in thermal conductivity results in greater heat dissipation between the metal pair in which it is located and consequently supports viscosity reduction associated with high temperatures.

9. The combustion engine lubricating oil according to claim 1, wherein at a temperature of about 25±2° C. the viscosity of the lubricating oil added with structurally modified graphite nanoflakes is 385% higher than the lubricant oil, and wherein the viscosity of the lubricating oil added with structurally modified graphite nanoflakes is 84% higher than the lubricating oil added without structurally modified graphite nanoflakes; and wherein at temperature of about 43±2° C. the viscosity of the lubricating oil added with structurally modified graphite nanoflakes is 414% higher than the lubricating oil, and wherein the viscosity of the lubricating oil added with structurally modified graphite nanoflakes is 21% higher than the lubricating oil added without structurally modified graphite nanoflakes.

10. The combustion engine lubricating oil according to claim 1, wherein the mineral lubricating oil added with structurally modified graphite nanoflakes chemically bonded to metallic particles has a rheopectic rheological behavior that increases proportionally to the increase in temperature, wherein the structurally modified graphite nanoflakes is in a concentration range higher than 2% and up to 3% weight/weight based on the total weight of the lubricating oil.

11. The combustion engine lubricating oil according to claim 1, wherein the lubricating mineral oil added with structurally modified graphite nanoflakes comprises mineral oil and nanoadditives.

12. The combustion engine lubricating oil according to claim 11, wherein the nanoadditives comprise structurally modified graphite nanoflakes, wherein the structurally modified graphite nanoflakes are unilaminar, multilaminar or a combination thereof, wherein the nanoparticles are at least one of ceramic, metallic, and polymeric, and wherein the nanoadditives form 0.05-3% weight/weight of the mineral lubricating oil.

13. The combustion engine lubricating oil according to claim 11, wherein the ceramic nanoparticles comprise aluminum oxide or aluminum nitride having a size of about 50 nm to about 100 nm.

14. The combustion engine lubricating oil according to claim 11, wherein the metal nanoparticles comprise copper or silver spheres having a size of a size of about 50 nm to about 100 nm.

15. The combustion engine lubricant oil according to claim 11, wherein the polymeric nanoparticles comprise polyaniline nanotubes having a width of about 40 nm to about 50 nm and a length of about 150 nm to about 200 nm.

16. The combustion engine lubricating oil according to claim 1, wherein the mineral oil lubricant added with structurally modified graphite nanoflakes chemically bonded to metallic nanoparticles shows a Previously Presentedtonian behavior when the structurally modified graphite nanoflakes are added up to 2% weight/weight.

17. The combustion engine lubricating oil according to claim 1, wherein the combustion engines lubricating oil is for automotive applications or for combustion engines.

18. The combustion engine lubricating oil according to claim 1, wherein the combustion engines lubricating oil is for industrial applications such as industrial gear boxes, compressors and turbines.

19. The combustion engine lubricating oil according to claim 1, wherein the lubricating oil is synthetic oil selected from the group consisting of poly-alpha-olefin, polyisobutylene, esters, and silicone based synthetic oil.

20. The combustion engine lubricating oil according to claim 1, wherein the concentration of structurally modified graphite nanoflakes chemically bonded to metallic nanoparticles is 0.5% weight/weight of structurally modified graphite nanoflakes with the lubricating oil; and the concentration of structurally modified graphite nanoflakes chemically bonded to polyaniline nanotubes is 2% weight/weight of structurally modified graphite nanoflakes with the lubricating oil.

21. The combustion engine lubricating oil according to claim 2, wherein the concentration of structurally modified graphite nanoflakes chemically bonded to metallic nanoparticles is 0.5% weight/weight of structurally modified graphite nanoflakes with the lubricating oil; and the concentration of structurally modified graphite nanoflakes chemically bonded to polyaniline nanotubes is 2% weight/weight of structurally modified graphite nanoflakes with the lubricating oil.

22. The combustion engine lubricating oil according to claim 19, wherein the concentration of structurally modified graphite nanoflakes chemically bonded to metallic nanoparticles is 0.5% weight/weight of structurally modified graphite nanoflakes with the lubricating oil; and the concentration of structurally modified graphite nanoflakes chemically bonded to polyaniline nanotubes is 2% weight/weight of structurally modified graphite nanoflakes with the lubricating oil.

\* \* \* \* \*